*Holmes & Butler,*
*Fire-Proof Safe.*
Nº 12,594. Patented Mar. 27, 1855.
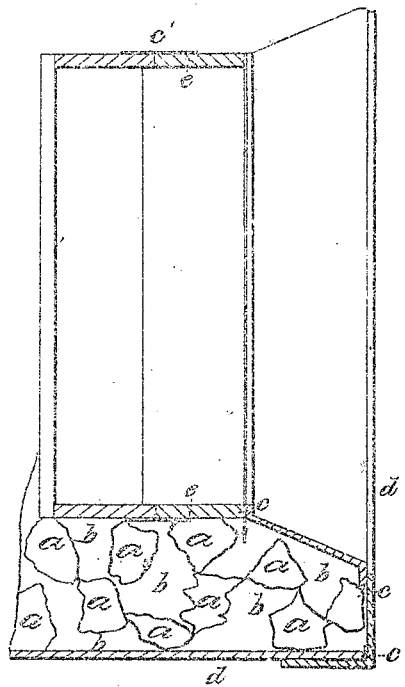

UNITED STATES PATENT OFFICE.

RICHARD HOLMES AND WILLIAM H. BUTLER, OF NEW YORK, N. Y.

FIREPROOF FILLING.

Specification of Letters Patent No. 12,594, dated March 27, 1855.

*To all whom it may concern:*

Be it known that we, RICHARD G. HOLMES and WILLIAM H. BUTLER, of the city, county, and State of New York, have invented certain new and useful Improvements in Fireproof Fillings of Safes, Banks, and other Doors and other So-Called "Fireproof" Structures; and we do hereby declare that the following is a full, clear, and exact description of the same, reference being had to the accompanying drawing, forming part of this specification, which represents a section of a portion of a safe with our improved fire proof filling, $d$ representing the outer wall of iron and $e$ the inner wall of wood, $a\ b$ representing the filling and $c\ c'$ the packing in the joints.

The heat resisting compound employed by us consists of a combination of clay or other earthy or incombustible matter, alum of commerce or some other salt that will melt with dry heat, and some alkalin substance.

We are aware that compounds of alum and clay have been used as filling for safes, &c., and the extraordinary fire resisting properties of alum have long been well known; but alum when in a heated wet, or melted state possesses the property of effacing writing in almost every description of ink, and of destroying many articles of delicate structure such as certain kinds of jewelry or any articles liable to be affected by the sulfuric acid contained therein. By the addition of a sufficient quantity of alkali to neutralize the acid of the alum or other salt it is deprived of its above described destructive property.

Of the incombustible earthy matters which may be substituted for clay, we will mention brick dust, pumice stone and soap stone, but we do not confine ourselves to these. Of the alkalin substances which may be employed as the neutralizing agent, ashes, lime, or soda may be used with nearly equal advantage. The different ingredients are to be mixed in a pulverized state and may be introduced between the walls of the safe or other structure in that state, or poured in while melted by heat. The proportions may require to be somewhat varied as some samples of alum contain more acid than others and some alkalies are stronger than others, but in practice we generally take four (4) parts by weight of clay, four (4) parts of alum and two (2) parts of ashes.

A mixture of alum and marble dust, or the dust from a marble saw will form a compound of essentially the same character as the above, as the marble dust contains the alkali necessary to neutralize its acid, and also the incombustible matter necessary to give body to the alum, to hold it in its place, the latter being the principal object of the clay or other earthy or incombustible matter used with the alum. We have used successfully a mixture of two parts by weight of marble saw dust and one of alum, these may be mixed and inserted cold and dry, or poured into the safe in a heated or melted state.

The compounds of alum, clay, &c., heretofore used as heat resisting media have possessed another serious defect in addition to the destructive property of the alum, inasmuch as when heated in a burning building they form a soft mud or slush that, settling down to the lowest part of the safe or other fire proof structure, runs and oozes through the joints thereof not only to the exterior but to the interior of the safe destroying every fragile substance with which it comes in contact, besides leaving the upper part of the safe or structure empty and exposed to the action of fire. This defect is what we design to obviate by the formation of cells of porous material, between the inner and outer wall to contain the compound, the pores of said cells being capable of absorbing, either by capillary attraction or chemical affinity, the soluble portions of the filling and the steam or vapor arising therefrom.

The material of which the cells are formed and the manner of constructing them may be varied but generally any porous substance may be used. We at present form the chambers by breaking brick into lumps of such size and irregular shapes as to touch each other and the sides of the safe, to form a mutual support, so that they cannot settle down, and at the same time do not present flat surfaces to each other but touch on points. The interstices $b$, $b$, represented in the drawing between these lumps $a$, $a$, constitute the cells which contain the filling. And the pores in the brick form smaller cells to receive the steam or vapor from the filling, or the melted filling itself.

Instead of using broken brick it might be advantageous to make bricks or tiles for the purpose, of very porous character, taking care they do not rest upon each other with flat surfaces but only touch on points so that the steam, vapor, or melted filling may circulate freely among them. The porous material of which the cells are constructed will continue during a fire to absorb the steam, vapor, or melted filling until all that is capable of flowing or evaporating is burnt out, and nothing remains but the portion that is incapable of either flowing or evaporating which will be left in the pores of the material of which the cells are constructed, and in the cells themselves, and the porous material and other unmelted and unevaporated portion of the filling remaining, form a cellular tissue of the best nonconducting material, having its cells filled with air and gases which are also poor conductors, the same extending to the top of the safe or structure.

We also propose in carrying out this mode of holding up the filling to insert in the interstices $b$, $b$, oyster shells, or other shells, or solid substances containing lime or other alkali, for the purpose at the same time both of holding up the filling and supplying the neutralizing agent before spoken of in this specification. We also propose to construct bricks or tiles of some porous earth or substance containing in itself the aforesaid neutralizing agent; and we further propose to form porous cells to receive the filling by inserting between the walls sheets, strips, or layers of blanket or other porous textile fabric, the said sheets, strips, or layers having been previously saturated with alum or with the fire proof compound hereinbefore described and formed in part of alum.

The packing or covering we employ for the joints both of the inner and outer walls of the safe, door, or other structure consists of strips of cloth or other porous flexible material dipped in melted alum or some fire proof compound consisting in part of alum. These strips are taken before the alum or compound upon them has set hard, and placed in the lap of the joint as shown at $c$, $c$, or over the joint as shown at $c'$, $c'$, according as the nature of the joint may require, and will effectively prevent the fire proof compound oozing through the joints.

We are aware that a compound of alum and clay has been used as a fire proof filling for safes; also that brick, soft stone, layers of pumice and other porous substances have been used for an interior fire proof lining or shield for the like purposes; likewise that, in connection with various soft porous fillings between the inner and outer cases of the safe, tubes containing alkalin solutions have been interspersed; none of such therefore do we claim, nor yet, as a mere antiphlogistic compound, the combination of an alkali with alum; but We do claim—

As a new and useful improvement in alum fillings of safes or other "fire proof" structures, essentially as specified, combining with the alum filling an alkali, in such proportions as that, the alum, in becoming heated or melted has a part of its acid neutralized by the action of the alkali; when the said filling is interspersed with and supported or restrained from settling down by cells ($a$) of porous material or framework of porous substance arranged substantially as described.

RICHARD G. HOLMES.
WILLIAM H. BUTLER.

Witnesses:
A. E. BEACH,
A. R. HAIGHT.